United States Patent Office 2,834,639
Patented May 13, 1958

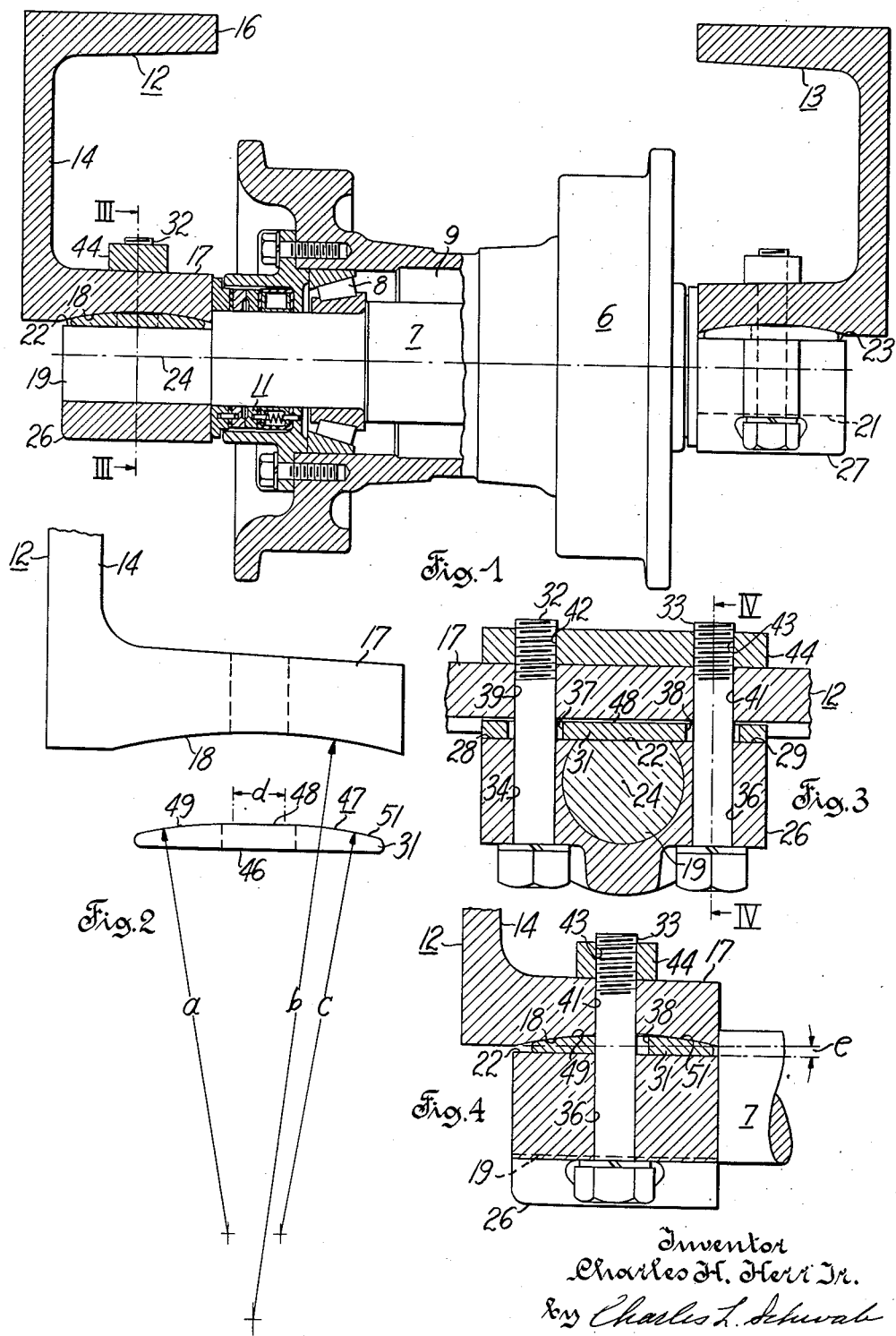

2,834,639

SHAFT MOUNTING FOR ROLLER ON TRACKED VEHICLE

Charles H. Herr, Jr., Springfield, Ill., assignor to Allis-Chalmers Manufacturing Company, Milwaukee, Wis.

Application March 8, 1955, Serial No. 492,979

12 Claims. (Cl. 305—1)

This invention relates to shaft mountings, and it is concerned more particularly with providing mounting structure for attaching a shaft to supports which will compensate for manufacturing variations, warpage and distortions in the supports.

In truck roller installations for crawler tractors, as shown for instance in U. S. Patent 2,568,897, issued September 25, 1951, to E. F. Norelius, wherein a stationary truck roller supporting shaft is secured at its opposite ends to the underside of a pair of rolled section channel members of a truck frame, it has been found that the bottom mounting surfaces of these rolled section channel members will not always be coplanar. The noncoplanar relationship of these bottom mounting surfaces of the channel members of an assembled track frame may be due to the tolerances allowed in manufacturing rolled stock and may also be due to distortions introduced in handling or in securing the channel members together to form the track frame.

In drawing the mounting brackets at opposite ends of the shaft up tight against the noncoplanar bottom surfaces on the channel members, the shaft is subjected to bending stresses and the resulting deflection of the shaft causes the truck roller bearings to wear at an accelerated rate. Also the truck roller shafts are apt to fail prematurely due to the additional bending stresses introduced in mounting them securely to noncoplanar mounting surfaces as previously mentioned.

Although the truck frame could be assembled and then the bottom surfaces of the channel members machined coplanar, this procedure would not guard against bending of the shaft when the track frame is permanently distorted under the rugged working conditions to which it is customarily subjected.

Generally, it is an object of this invention to provide an improved self-aligning shaft mounting which takes care of the beforementioned difficulties and requirements in a practical and satisfactory manner.

More specifically it is an object of this invention to provide an improved truck roller shaft mounting which will protect the shaft against undue bending when the channel members supporting it are deflected in use.

A further object of the invention is to provide a shaft mounting arrangement wherein the supporting member may be made of rolled metal and the dimensional deviations inherent in rolled stock do not prevent a satisfactory mounting of the shaft.

A further object of this invention is to provide an improved truck roller shaft mounting which gives satisfactory service, eliminates excessive wear of the truck roller bearings, is easy to assemble and disassemble and is economical to manufacture.

These and other objects and advantages of this invention will be evident when the following description is read in conjunction with the accompanying drawings, in which:

Fig. 1 is an elevation partially in section showing a truck roller installation for crawler tractors;

Fig. 2 is an enlarged view of part of the shaft mounting structure shown in Fig. 1;

Fig. 3 is a section view taken on line III—III in Fig. 1; and

Fig. 4 is a section view taken on line IV—IV in Fig. 3.

Referring to Fig. 1 of the drawings, a truck roller 6 for an endless self-laying track unit is rotatably mounted on a non rotating shaft 7 by a pair of tapered roller bearings 8, only one of which is exposed. Lubricant is maintained in the cavity 9 of the truck roller 6 by a pair of axial contact seal units 11, only one of which is exposed. The shaft 7 is nonrotatably secured at its opposite ends to a pair of rigidly interconnected rolled section channels 12 and 13.

Referring to Figs. 1 and 2, channel 12 has a web portion 14, a top flange 16 and a bottom flange 17. The bottom flange 17 has a downward facing concave mounting surface 18 formed on a radius $b$. Channel 13 is similarly formed.

Referring to Figs. 1 and 3, the shaft 7 at its opposite ends has attaching portions 19 and 21 of reduced diameter and flats 22 and 23, respectively, which lie in a plane parallel to the axis 24 of shaft 7. C-shaped brackets 26 and 27 envelop the cylindrical faces of attaching portions 19 and 21. Bracket 26 presents flats 28 and 29 which are coplanar with flat 22 on shaft 7.

Although the description following will be limited to the mounting structure for the left end of the truck roller shaft, the description will be equally applicable to the mounting structure for the right end of the shaft.

A compensating adapter element 31 is interposed between flats 28 and 29 of bracket 26 and flat 22 of shaft 7 on one side, and concave bearing surface 18 on channel 12 on the other side. A pair of bolts 32 and 33 extend through holes 34 and 36 in bracket 26, through oversize holes 37 and 38 in adapter 31, through holes 39 and 41 in channel flange 17 and have their threaded upper ends screwed into drilled and tapped holes 42 and 43 of nut block 44.

Referring to Fig. 2, the adapter has a plane bottom surface 46 and a cylindrically convex top surface 47. A crown 48 of top surface 47 is flat over a width $d$ and curved portions 49 and 51 of top surface 47 at opposite sides of crown 48 are formed on radii $a$ and $c$, respectively, whose centers are on lines parallel to one another and are also parallel to the center line on which radius $b$ lies. As shown in Fig. 2, the radius centers $a$ and $c$ are equally spaced from radius center $b$ and lie at opposite transverse sides of the latter, and this relationship exists when the channel and adapter are accurately formed. Also, as shown, the distance between the centers of radii $a$ and $c$ is equal to the width $d$ of crown 48.

When the adapter 31 is in thrust transmitting relation with channel 12 as shown in Figs. 1 and 3, the flattened crown 48 does not bear against the concave bearing surface 18 but is spaced therefrom as clearly appears in Fig. 3.

The channels 12 and 13 are rolled section steel and the concave surface 18 in the bottom of flange 17 is rolled into the channel at the same time that the channel is rolled in the steel mill. Commercial rolled stock is seldom dimensionally accurate and, for instance, bow and camber tolerances for rolled channels frequently run 1/8 inch in 60 inches. Also the flanges of a rolled channel will usually be out of square with the outer side of the web and the out of square tolerance may be 1/32 of an inch for each inch of flange width.

The shaft mounting of this invention compensates for the usual dimensional variations peculiar to rolled section channels. For instance, if the bottom of flange 17 is out of parallel with the flat 22 of shaft 7 by an angle $e$, as shown in Fig. 4, the adapter may be moved to the right and the convex bearing faces 49 and 51 will be in bearing contact with concave bearing surface 18 of channel 12. Shifting of the adapter to the right and left is facilitated by making holes 37, 38 larger in diameter than bolts 32, 33. As shown in Fig. 4, the adapter is shifted to the right to the limit allowed by bolts 32 and 33. By virtue of the construction of the adapter 31 its convex portions 49 and 51 will bear against the concave surface 18 of flange 17 even when the flange 17 is dimensionally distorted relative to the axis of shaft 7 and, accordingly, the fastening means may be drawn up tight without bending the shaft 7 as would occur if the shaft and bracket were drawn up against the flat bottom surface of a conventional channel possessing the mentioned dimension inaccuracies.

The drawings and foregoing description reveal a shaft mounting structure wherein a pair of adapters with convex bearing surfaces may be adjusted in the direction of the axis of the truck roller shaft 7 so as to compensate for dimensional inaccuracies in the rolled section channels 12 and 13 which support the shaft 7 at its opposite ends.

The shaft mounting of this invention permits use of rolled section supporting channels which are less expensive than finish machined supporting members and eliminates bending of the truck roller shaft which would result in a conventional mounting arrangement, such as is shown in the previously mentioned Patent Number 2,568,897, when the bottom mounting surfaces of the channels are noncoplanar.

It should be understood that it is not intended to limit the invention to the particular forms and details described hereinabove and that the invention includes such other forms and modifications as are embraced by the scope of the appended claims.

It is claimed and desired to secure by Letters Patent:

1. In combination: a support member, a shaft having an attaching portion in overlapping relation to said support at one side of the latter; a bracket connected with said attaching portion at said one side of said support; an adapter member operatively interposed between said bracket and said one side of said support, one of said support and adapter members presenting a concave bearing surface and the other of said members presenting a convex bearing surface complementary to and in load transmitting engagement with said concave bearing surface, one said surface being adjustable with respect to the other said surface; and releasable fastening means operatively associated with and rigidly retaining said bracket, adapter member and support member in cooperating load transmitting relation to one another.

2. The combination set forth in claim 1 in which said support member presents said concave bearing surface and said adapter member presents said convex bearing surface.

3. The combination set forth in claim 1 in which said bearing surfaces are substantially cylindrically formed on an axis extending at right angles to the axis of said shaft.

4. The combination set forth in claim 3 in which said support member presents said concave bearing surface and said adapter member presents said convex bearing surface.

5. In combination: a support having a cylindrically concave bearing surface on one side; a shaft extending at right angles to the axis on which said concave bearing surface is formed and having an attaching portion in overlapping relation to said one side of said support; a bracket connected with said attaching portion of said shaft at said one side of the said support; an adapter element operatively interposed between said bracket and said one side of said support and presenting a convex bearing surface which is adjustable with respect to and shaped generally complementary to said concave bearing surface on said support; and releasable fastening means associated with and rigidly retaining said bracket, adapter element and support in cooperating load transmitting relation to one another, said convex bearing surface having a flattened crown permitting easier adjustment of said adapter.

6. A truck roller shaft mounting for self-laying track units comprising, in combination: a rolled section track frame member having a downward facing cylindrically arcuate mounting surface; a truck roller shaft having an attaching portion disposed in underlying relation to said arcuate mounting surface; a bracket element connected with said attaching portion of said shaft; an adapter element operatively interposed between said bracket element and said arcuate mounting surface and presenting a cylindrically arcuate bearing surface which is adjustable with respect to and in complementary load transmitting relation to said arcuate mounting surface; and releasable fastening means operatively associated with and rigidly securing said bracket element, adapter element and track frame member in cooperating thrust transmitting relation to one another.

7. A truck roller shaft mounting for self-laying track units comprising, in combination: a track frame member of rolled section channel having a downward facing cylindrically concave mounting surface rolled on the lower flange thereof; a truck roller shaft having an attaching portion disposed in underlying relation to said concave mounting surface; a bracket element connected with said attaching portion of said shaft; an adapter element operatively interposed between said bracket element and said concave mounting surface and presenting a cylindrically convex bearing surface which is adjustable with respect to and in complementary load transmitting relation to said concave mounting surface; and releasable fastening means operatively associated with and rigidly securing said bracket element, adapter element and track frame member in cooperating thrust transmitting relation to one another.

8. A truck roller shaft mounting for self-laying track units comprising, in combination: a track frame member of rolled section channel having a downward facing cylindrically concave mounting surface rolled in the lower flange thereof; a truck roller shaft having an attaching portion disposed in underlying relation to said arcuate mounting surface; a bracket element connected with said attaching portion of said shaft; an adapter element operatively interposed between said bracket element and said arcuate mounting surface and presenting a cylindrically convex bearing surface with flattened crown in complementary load transmitting relation to said concave mounting surface, said convex bearing surface being adjustable with respect to said concave mounting surface; and releasable fastening means operatively associated with and rigidly securing said bracket element, adapter element and track frame member in cooperating thrust transmitting relation to one another.

9. A truck roller shaft mounting for self-laying track units comprising, in combination: a rolled section track frame member having a downward facing cylindrically arcuate mounting surface; a truck roller shaft having an attaching portion disposed in underlying relation to said arcuate mounting surface; an adapter element operatively interposed between said attaching portion of said shaft and said arcuate mounting surface and presenting a cylindrically arcuate bearing surface which is adjustable with respect to and in complementary load transmitting relation to said arcuate mounting surface; and releasable connecting means operatively associated with and rigidly securing said shaft, adapter element and track frame member in cooperating thrust transmitting relation to one another.

10. A truck roller shaft mounting for self-laying track units comprising, in combination: a track frame member of rolled section channel having a downward facing cylindrically concave mounting surface rolled on the lower flange thereof; a truck roller shaft having an attaching portion disposed in underlying relation to said concave mounting surface; an adapter element operatively interposed between said attaching portion of said shaft and said concave mounting surface and presenting a cylindrically convex bearing surface which is adjustable with respect to and in complementary load transmitting relation to said concave mounting surface; and releasable connecting means operatively associated with and rigidly securing said shaft, adapter element and track frame member in cooperating thrust transmitting relation to one another.

11. A truck roller shaft mounting for self-laying track units comprising, in combination: a track frame member of rolled section channel having a downward facing cylindrically concave mounting surface rolled on the lower flange thereof; a truck roller shaft having an attaching portion disposed in underlying relation to said concave mounting surface; an adapter element operatively interposed between said attaching portion of said shaft and said concave mounting surface and presenting a cylindrically convex bearing surface with flattened crown in complementary load transmitting relation to said concave mounting surface, said convex bearing surface being adjustable with respect to said concave mounting surface; and releasable connecting means operatively associated with and rigidly securing said shaft, adapter element and track frame member in cooperating thrust transmitting relation to one another.

12. A truck roller shaft mounting for self-laying track units comprising, in combination: a track frame member of rolled section channel having a downward facing cylindrically concave mounting surface rolled on the lower flange thereof; a truck roller shaft having an attaching portion disposed in underlying relation to said concave mounting surface; an adapter element operatively interposed between said attaching portion of said shaft and said concave mounting surface and presenting a bearing surface which is adjustable with respect to and in complementary load transmitting relation to said concave mounting surface, said bearing surface having a flattened crown and cylindrically convex faces formed at opposite sides of said crown on spaced parallel axes; and releasable connecting means operatively associated with and rigidly securing said shaft, adapter element and track frame member in cooperating thrust transmitting relation to one another.

References Cited in the file of this patent

UNITED STATES PATENTS

| | | |
|---|---|---|
| 1,746,001 | Leake | Feb. 4, 1930 |
| 1,796,533 | Pearson | Mar. 17, 1931 |
| 2,666,674 | Deffenbaugh | Jan. 19, 1954 |